(12) United States Patent
Rapp et al.

(10) Patent No.: US 9,533,785 B2
(45) Date of Patent: Jan. 3, 2017

(54) APPARATUS FOR TRANSPORTING ARTICLES, IN PARTICULAR PACKAGING MEANS

(71) Applicant: Robert Bosch GmbH, Stuttgart (DE)

(72) Inventors: Reinhard Rapp, Stuttgart (DE); Ruediger Grabowski, Waiblingen (DE); Josef Weis, Nussloch (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 14/408,109

(22) PCT Filed: Apr. 18, 2013

(86) PCT No.: PCT/EP2013/058065
§ 371 (c)(1),
(2) Date: Dec. 15, 2014

(87) PCT Pub. No.: WO2013/185957
PCT Pub. Date: Dec. 19, 2013

(65) Prior Publication Data
US 2015/0139772 A1      May 21, 2015

(30) Foreign Application Priority Data

Jun. 14, 2012   (DE) .................. 10 2012 209 978

(51) Int. Cl.
*B65B 43/16*   (2006.01)
*B65B 43/14*   (2006.01)
(Continued)

(52) U.S. Cl.
CPC ............... *B65B 43/145* (2013.01); *B31B 1/00* (2013.01); *B65B 35/20* (2013.01); *B65B 43/185* (2013.01);
(Continued)

(58) Field of Classification Search
CPC ........ B65B 43/145; B65B 51/00; B65B 35/20; B65B 43/185; B65B 43/265; B65B 59/005; B65B 43/24; B65B 43/285; B65B 43/305; B65B 43/325; B65B 43/44; B65G 17/20; B65G 59/02; B31B 1/00; B31B 2201/0282; B31B 2201/282
(Continued)

(56) References Cited

U.S. PATENT DOCUMENTS 3,060,654 A      10/1962 Lubersky et al.
3,408,906 A *    11/1968 Heffelfinger ............... B31B 1/78
                                                        493/134
(Continued)

FOREIGN PATENT DOCUMENTS

DE       10128185       12/2002
DE       102007034872    1/2009
(Continued)

OTHER PUBLICATIONS

Beckhoff Automation GmbH & Co. KG, "XTS. The Linear Transport System from Beckhoff," YouTube, Jun. 6, 2012, retrieved from the internet Feb. 26, 2015, https://www.youtube.com/watch?v=GQsnjFTG26U (3 pages).
(Continued)

*Primary Examiner* — Jeannette E Chapman
(74) *Attorney, Agent, or Firm* — Michael Best & Friedrich LLP

(57) ABSTRACT

The invention relates to a device for transporting objects, in particular packaging means, said device comprising a continuous conveying section (3) and a plurality of conveying assemblies (40) that circulate on the conveying section (3). Each conveying assembly (40) comprises a first conveying element (4) and a second conveying element (5) and each of
(Continued)

Figure 1:
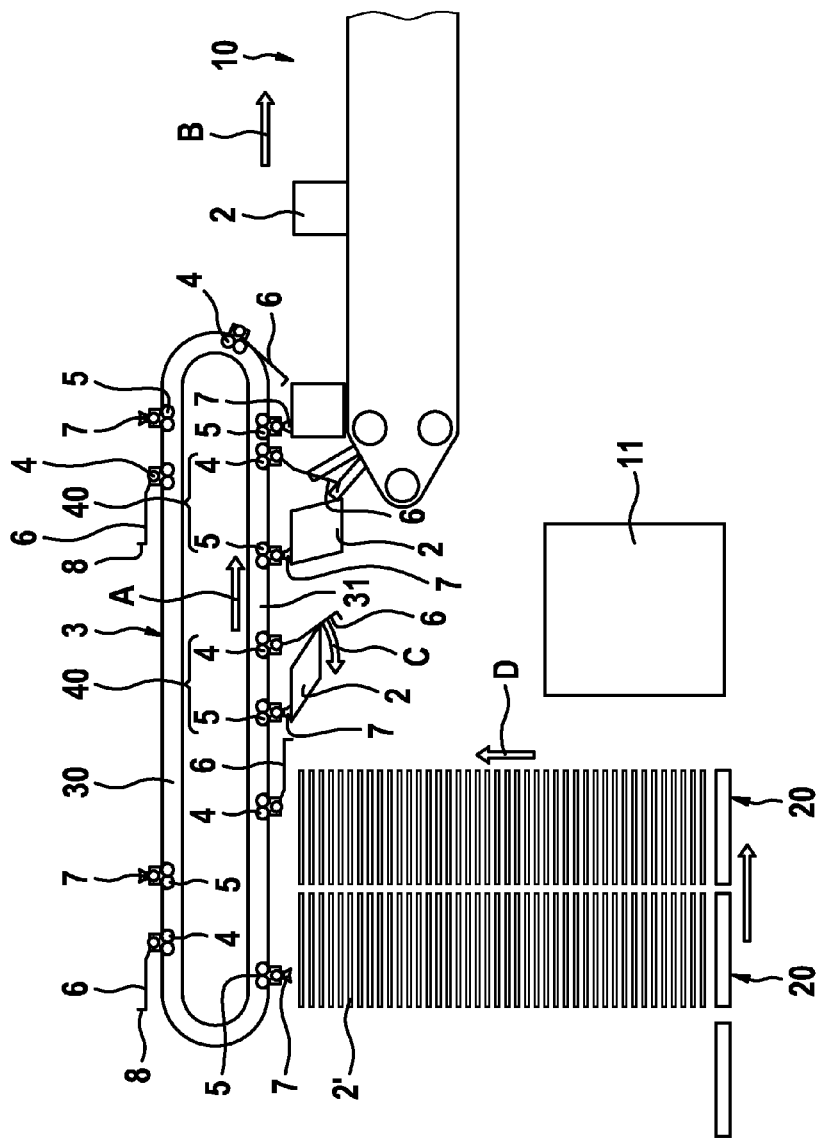

said conveying elements (4, 5) can be driven individually and independently of one another. The conveying elements (4, 5) are designed to jointly transport one individual object (2).

16 Claims, 2 Drawing Sheets

(51) Int. Cl.
| | |
|---|---|
| *B65B 43/18* | (2006.01) |
| *B65B 43/26* | (2006.01) |
| *B65B 59/00* | (2006.01) |
| *B31B 1/00* | (2006.01) |
| *B65B 35/20* | (2006.01) |
| *B65B 51/00* | (2006.01) |
| *B65G 17/20* | (2006.01) |
| *B65G 59/02* | (2006.01) |

(52) U.S. Cl.
CPC ............. *B65B 43/265* (2013.01); *B65B 51/00* (2013.01); *B65B 59/005* (2013.01); *B65G 17/20* (2013.01); *B65G 59/02* (2013.01); *B31B 2201/0282* (2013.01); *B31B 2201/282* (2013.01)

(58) Field of Classification Search
USPC ........................ 53/564, 566, 131.4, 251–252; 493/309–319; 414/796.9, 797, 797.2, 797.3
See application file for complete search history.

(56) References Cited

U.S. PATENT DOCUMENTS

| | | | | |
|---|---|---|---|---|
| 3,566,762 | A * | 3/1971 | Vadas | B31B 1/78 493/134 |
| 5,067,937 | A * | 11/1991 | Aschaber | B31B 5/80 493/310 |
| 5,473,868 | A * | 12/1995 | Antonio | B65B 43/345 493/309 |
| 5,531,661 | A * | 7/1996 | Moncrief | B65B 43/265 493/313 |
| 5,562,581 | A * | 10/1996 | Roberto | B65B 43/305 493/310 |
| 5,613,828 | A * | 3/1997 | Haddow | B65B 43/305 414/798.9 |
| 5,715,657 | A | 2/1998 | Mondani et al. | |
| 7,310,925 | B2 * | 12/2007 | Monti | B65B 5/024 493/309 |
| 2003/0205027 | A1 * | 11/2003 | Sus | B65B 43/305 53/437 |
| 2008/0289930 | A1 | 11/2008 | Fischer | |
| 2009/0025343 | A1 | 1/2009 | Salm | |
| 2009/0320958 | A1 | 12/2009 | Matheyka | |

FOREIGN PATENT DOCUMENTS

| | | | |
|---|---|---|---|
| EP | 0705684 | 4/1996 | |
| EP | 0881182 | 12/1998 | |
| EP | 1530541 | 5/2005 | |
| JP | S62102523 | 6/1987 | |
| JP | H11503693 | 3/1999 | |
| JP | 2005132435 | 5/2005 | |
| WO | WO 9607592 A2 * | 3/1996 | ........... B65B 59/005 |
| WO | 03/047977 | 6/2003 | |

OTHER PUBLICATIONS

Beckhoff Automation GmbH & Co. KG, "Hannover Messe 2012, Day 1: Beckhoff Trade Show TV," YouTube, Apr. 24, 2012, retrieved from the Internet Feb. 26, 2015, https://www.youtube.com/watch?v=85WFTcww-qW (2 pages).
Beckhoff Automation GmbH & Co. KG, "Hannover Messe 2012, Day 2: Beckhoff Trade Show TV," YouTube, Apr. 24, 2012, retrieved from the Internet Feb. 26, 2015, https://www.youtube.com/watch?v=pVVRCUCcd6A (1 pages).
Beckhoff Automation Canada, "Hannover Messe 2012, Beckhoff Automation XTS conveyor concept," video, Jun. 5, 2012, retrieved from the internet Feb. 26, 2015, https://www.dpncanada.com/Video-Library/Trade-Shows-Conferences/Hannover-Messe-2012-Beckhoff-Automation-XTS-conveyor-concept.html (1 pages).
Beckhoff, "Drive Technology—Rethought, XTS.eXtended Transport System," brochure, pp. 1-32 (2012).
"Novel linear motor system 'will open up new machine concepts'" Drives & Controls—[Online] Apr. 30, 2012 Retrieved from the internet http://www.drivesncontrols.com/news/archivestory.php/aid/3495/Nove_linear_motor_system_%60will_open_up_new_machine_concepts%60.html [retrieved Feb. 20, 2015].
Michael Kleine, "Der lineare Kreis" K-Magazin—[Online] Apr. 2012, Retrieved from the Internet http://www-k-magazin.de/index.cfm?pid=1465&pk=119361#.VQBor1c_xtF [retrieved Feb. 20, 2015].
"Hannover Messe: Extended transport drive system Beckhoff's XTS drive system combines rotary and linear systems for mechanical engineers" Plant Engineering [Online] Apr. 26, 2012 Retrieved from the internet http://www.drivesncontrols.com/news/archivestory.php/aid/3495/Nove_linear_motor_system_%60will_open_up_new_machine_concepts%60.html [retrieved Feb. 20, 2015].
International Search Report for Application No. PCT/EP2013/058065 dated Sep. 5, 2013 (English Translation, 2 pages).

\* cited by examiner

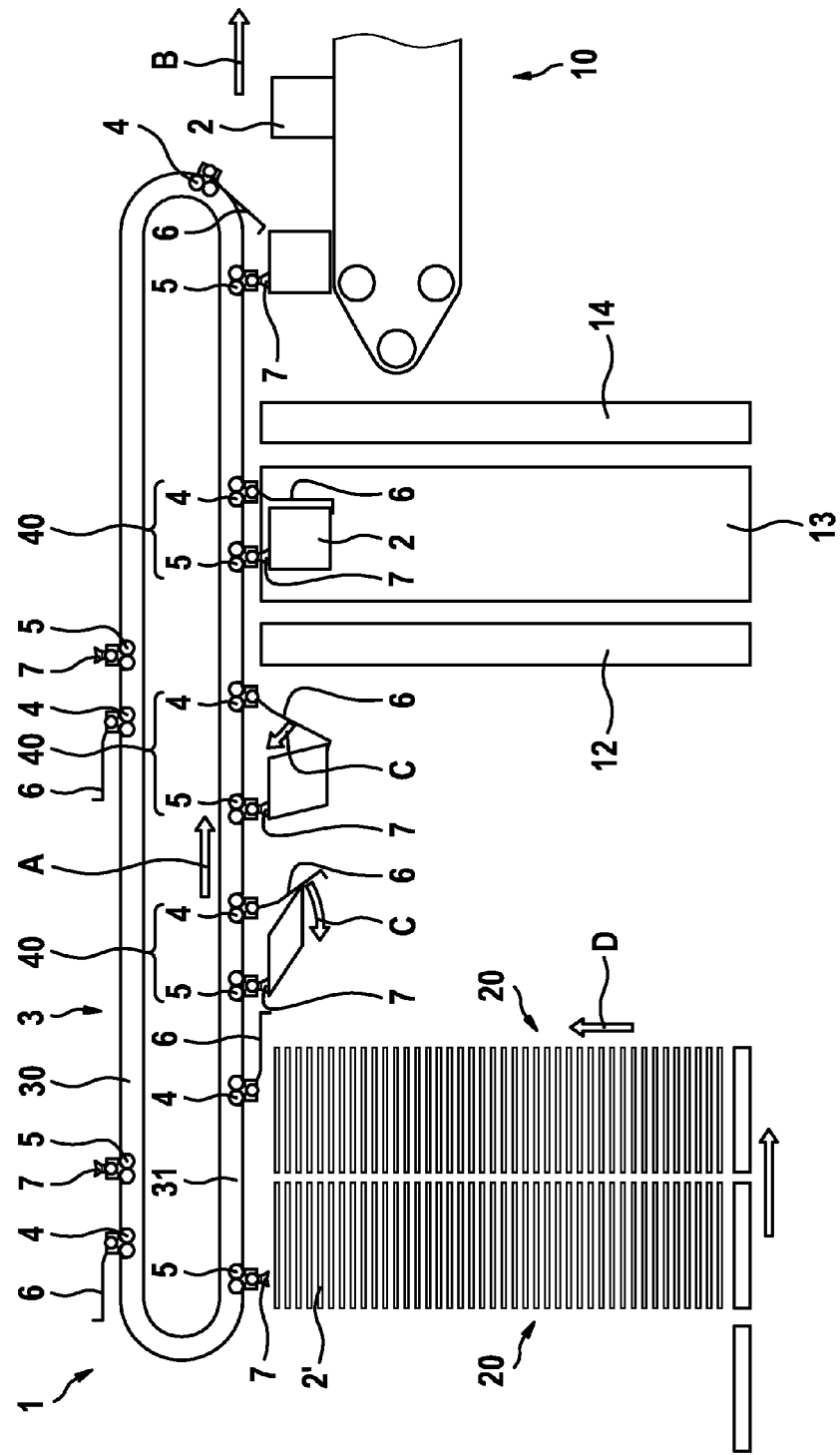

APPARATUS FOR TRANSPORTING ARTICLES, IN PARTICULAR PACKAGING MEANS

PRIOR ART

The present invention relates to an apparatus for transporting articles, and in particular for transporting packaging means, e.g. cartons.

The field of packaging technology includes packaging by means of cardboard cartons, which, on account of the packaging material, has to meet specific requirements. It is frequently the case here that a plurality of articles are packed together in a carton and made ready for shipping. It is usually the case here that an open carton is packed from above, as is known for example from EP 1 530 541 B1. This known cartoning machine, however, has the disadvantage that, in the case of format adjustments, for example changeover to larger or smaller cartons, it is also necessary for the corresponding retaining means for the cartons to be changed over or adjusted, for example, mechanically, which leads to long changeover and stoppage periods for the cartoning machines. In addition, it is a perennial problem with known cartoning machines that various handling steps, e.g. the operations of opening up a collapsed carton blank, of loading the opened-up carton, and of closing the loaded carton, etc., require different cycle times, and therefore the machine output which can be achieved is determined by the longest-lasting operation. During operation, however, this often results in undesired fluctuations in speeds in modules with relatively short operating times and/or in undesired stoppages and synchronization problems. There is also the problem in the prior art that the conveying devices have rigid partitionings between individual stations, said partitionings resting on the transporting elements used, e.g. chains, toothed belts, etc. It is also the case that other previously known proposed apparatuses with independently driven transporting elements maintain the rigid station partitioning. This gives rise to relatively long periods being required for through-passage through such a cartoning machine and in a construction which requires an unnecessarily large amount of space.

DISCLOSURE OF THE INVENTION

In contrast, the apparatus according to the invention for transporting articles, in particular for transporting packaging machines, having the features of claim 1 has the advantage that rigid partitioning is eliminated from the transporting device. This makes it possible to avoid fluctuations in speeds and build-ups on various modules arranged on the transporting route, as well as undesired stoppages, and to do away with synchronization problems. Moreover, elimination of the fixed partitioning also results in staggering of individual operating steps, to the extent that it is no longer necessary as in the prior art, on account of the existing timing of the machine, for each operation to take up an always equal part of the fixed cycle time; rather, each operating step need take up no more than precisely the amount of time which is necessary. Thus freed-up time reserves can be used in order for other operations to take place more slowly and carefully or for increasing the output. This is achieved according to the invention in that the apparatus has a circulating conveying route and a multiplicity of conveying devices, which circulate on the conveying route. Each conveying device here comprises a first conveying element and a second conveying element, which can each be driven individually and independently of one another. The first and second conveying elements here transport an article, e.g. a carton, together. It is therefore the case that two conveying elements which can be displaced freely in relation to one another form a common conveying device, which circulates on the conveying route.

This concept according to the invention makes it possible for, for example, two different handling devices to be arranged, and moved individually, on the two conveying elements of the common conveying device.

The dependent claims disclose preferred developments of the invention.

The conveying elements can preferably be driven by means of linear drives. This can provide for a straightforwardly constructed and reliably functioning conveying system which can provide for individual conveying elements which can be driven independently of one another.

It is further preferable for the circulating conveying route to be arranged vertically. This gives rise to an upper strand and a lower strand on the conveying route, and it is possible for the articles to be conveyed on the lower strand. This makes it possible to utilize a space beneath the conveying route, for example by virtue of a wide variety of handling modules being arranged there. The articles are preferably transported exclusively on the lower-strand region of the conveying route.

The two conveying elements of each conveying device particularly preferably each have a handling device which differs from the other. The handling device of the first conveying element here is an erecting device for erecting a collapsed packaging means, and the handling device of the second conveying element is preferably a retaining device for retaining the packaging means. The retaining device is preferably a suction element or a gripper or the like. The erecting device is preferably a pivotable lever.

According to a further preferred configuration of the present invention, the vertically arranged conveying route has arranged beneath it a packaging-means module with a packaging-means store and/or a closure module for closing packaging means and/or an identifying module for providing packaging means with identification and/or a weighing module for weighing purposes. The closure module preferably comprises means for closing flaps of the packaging means and then fixing same for example by means of hot-setting adhesive. The identifying module may comprise, for example, a printing device, which prints an identification directly onto the packaging machines, or alternatively a label-sticking unit, which sticks labels or the like onto the packaging means.

It is also preferable for a loading module for laterally loading a packaging means conveyed by the conveying device to be provided to the side of the vertically arranged conveying route. The loading module preferably comprises at least one pushing-in element. It is also preferable for the loading module to comprise a closed, in particular oval, circulatory path, on which a multiplicity of pushing-in elements circulate. This allows for a pushing-in operation in the horizontal direction even if the packaging means is being moved by means of the apparatus according to the invention, wherein the pushing-in elements are moved at the same speed on circulatory paths. It is particularly preferable here for the pushing-in elements each to be driveable individually and independently of one another, e.g. by means of a linear drive, on the circulatory path of the loading module. This also makes it possible to realize an independent pushing-in movement by way of individual pushing-in elements. As a result of using the circulatory path on the loading module, the operating route and the return route are not the same and, for example, the pushing-in elements can be moved on the respective routes by way of flexible movement profiles. It is also the case that this flexible loading module achieves the situation where format alterations or format changeovers do not have any effect on the loading module, which can be adapted in flexible fashion to such format alterations simply by virtue of the movement sequence being altered. For the return operation, it is also possible for the pushing-in elements to be guided in a drive-free manner in some places or to be moved by being carried along mechanically or by travelling in an accumulated state or the like or using available kinetic energy.

According to a further preferred configuration of the present invention, the articles which are to be transported are packaging means, in particular cartons. It is particularly preferable here for the apparatus to be a cartoning apparatus in which a collapsed carton is accommodated and erected (opened up), subsequently loaded and then closed and, if appropriate, also provided with identification, wherein all the operations are carried out preferably on the lower-strand region of the circulating conveying route. Transfer to a further transporting system can then take place.

DRAWING

Preferred exemplary embodiments of the invention will be described in detail hereinbelow with reference to the accompanying drawing, in which:

FIG. 1 shows a schematic side view of a packaging arrangement according to a first exemplary embodiment of the invention, and FIG. 2 shows a schematic side view of a packaging arrangement according to a second exemplary embodiment of the invention.

PREFERRED EMBODIMENTS OF THE INVENTION

A packaging arrangement 1 according to a first preferred exemplary embodiment of the invention will be described in detail hereinbelow with reference to FIG. 1.

As can be seen from FIG. 1, the packaging arrangement 1 for transporting a packaging means 2 comprises a circulating conveying route 3, which is arranged in oval form. The circulating conveying route 3 here is arranged in the vertical direction, and therefore an upper-strand region 30 and a lower-strand region 31 are present. The packaging means 2 are conveyed in suspended fashion on the lower-strand region 31.

A multiplicity of conveying elements are arranged on the circulating conveying route, reference sign 4 designating a first conveying element and reference sign 5 designating a second conveying element. The two conveying elements 4, 5 have different handling devices, wherein the first conveying element 4 has an erecting device 6 and the second conveying element 5 has a retaining device 7. The erecting device 6 of the first conveying element is a pivotable lever, of which the free end is bent over in hook form and forms a flap-opening device 8. The retaining device 7 of this exemplary embodiment is a sucker, although, as an alternative, it may also be, for example, a gripper or the like.

As indicated in FIG. 1 by the curly brackets, a first conveying element 4 and a second conveying element 4 here form a common conveying device 40. The two conveying elements 4, 5 of the conveying device 40 interact when the packaging means 2 is being removed and opened up. It is nevertheless possible here for each individual conveying element of each conveying device 40 to be activated and moved individually and independently of the other conveying elements, preferably by means of a linear drive.

As can also be seen from FIG. 1, the packaging means 2 are arranged in a plurality of packaging-means stores 20, wherein reference sign 2' denotes packaging means collapsed in each case in the packaging-means stores. Since the circulating conveying route 3 is arranged vertically, the packaging-means store 20 may be arranged beneath the conveying route 3. It is thus possible for the two interacting first and second conveying elements 4, 5, which form the common conveying device 40, to remove in each case the uppermost collapsed packaging means 2' from the stack. As indicated in FIG. 1, a plurality of packaging-means stacks may be provided beneath the conveying route 3, wherein in particular flexible changeover of removal positions of the collapsed packaging means 2' between the individual stacks is possible. Since the collapsed packaging means 2' are removed from the top, the size of the residual stack in the packaging-means store is immaterial, and this therefore means that reliable processing is always possible since the packaging-means stacks are readjusted in height (arrow D) in each case following a removal operation. In addition, it is also possible for the packaging-means stores to be pre-filled with packaging means outside the packaging arrangement and to be exchanged for empty magazines, without the installation being stopped, while a production process is underway.

Furthermore, the use of two individually driveable and displaceable first and second conveying elements 4, 5 makes it possible for each packaging means to be removed from the packaging-means store 20, and erected, irrespective of format. This is because the invention makes it possible for a spacing in the running direction between the first and second conveying elements to be predetermined individually in respect of the respective pack size by a control unit, and it is therefore readily possible for packing means of a wide variety of different sizes to be processed. There are no format restrictions here, for example as a result of holder or mounts for the packs or the like. The spacing between the first and second conveying elements 4, 5 can be adjusted individually in each case. It is also possible to use the packaging arrangement according to the invention for processing packaging means of different sizes for example alternately.

In the case of the exemplary embodiment shown in FIG. 1, then, first of all a collapsed packaging means 2' is removed from the packaging-means store 20 by the common conveying device 40, formed by the first and second conveying elements 4, 5. Thereafter, the collapsed packaging means is erected by virtue of the erecting device 6 being pivoted in the direction of the arrow C, wherein the first and second conveying elements are moved along the circulating conveying route 3 in the direction of the arrow A. The pivoting direction of the erecting device 6 here is counter to the conveying direction on the conveying route. For the purpose of erecting the collapsed packaging means 2', it is possible here for the two conveying elements 4, 5 to be moved at the same speed or, as an alternative, for one of the conveying elements 4, 5 to be moved more quickly than the other one of the conveying elements, this giving rise to the packaging means being erected. The erected packaging means 2 is then transferred to a transporting system 10, in which the erected packaging means can be filled, onward transportation taking place in the direction of the arrow B.

Furthermore, reference sign 11 denotes a rejects container, in which defective packaging means can be separated out.

FIG. 2 shows a packaging arrangement 1 according to a second exemplary embodiment of the invention, identical or technically identical components being designated by the same reference signs as in the first exemplary embodiment.

As in the first exemplary embodiment, a first conveying element 4 and a second conveying element 5 of the second exemplary embodiment form a common conveying device 40. In the second exemplary embodiment, however, the circulating conveying route 30 also has arranged beneath it, in addition to means for removing and erecting the collapsed packaging means 2, an identifying module 12 and a closure module 14. The identifying module 12 provides printing on the packaging means 2 in order to identify the contents. Furthermore, a loading module 13 fills the opened packaging means 2 with articles. The loading module 13 here is arranged to the side of the vertically arranged conveying route 3, and it is therefore possible for the articles to be pushed laterally into the opened packaging means 2. In order for the pushing-in operation to take place correctly, a flap-opening device 8 in the form of a bent-over hook-shaped element is provided at the free end of the erecting device 6, said device 8 opening the flaps of the packaging means 2 and keeping them in the open position. The loading module 13 is followed downstream, as seen in a transporting direction (arrow A), by a closure module 14, which closes the loaded, still open packaging means 2. It is possible here for the closure module 14 to have, for example, active elements, e.g. grippers or the like, and/or passive elements (fixed guide rails or the like), in order to carry out the closure operation.

It is also the case in the second exemplary embodiment that the individual conveying elements 4, 5 can each be driven, once again, individually and independently of one another. It is thus possible for different speeds to be realized in particular for the different modules. For example it is possible, in the case of the identifying module, for the common conveying device 40, formed by the first and second conveying elements 4, 5, to be stopped completely. In contrast, in the case of the loading module 13, it is possible to maintain a predetermined speed for the common conveying device, formed by the first and second conveying elements 4, 5, wherein the loading module has a pushing-in element which is correspondingly moved along with it. It is also the case that the closure module 14 may have for example active closure elements, such as grippers or the like, moving along at predetermined speeds with the moving packaging means.

To summarize, it can therefore be said that, for the above-described exemplary embodiments of the packaging arrangement 1 according to the invention, suspended transportation of packaging means, in particular packaging cartons, is possible, wherein it is also possible, at the same time, for collapsed packaging means to be removed and erected. The suspended arrangement of the packaging means, as a result of the vertically arranged conveying route 3, thus makes it possible to utilize the space beneath the transported packaging means for arranging a wide variety of different modules. The conveying elements are moved individually on the conveying route, and in each case a first conveying element 4 and a second conveying element 5 form a common conveying device 40, executing the operation of conveying an individual article on the conveying route 3.

Furthermore, combining (combination in terms of time) two individual conveying elements to form a common conveying device 40 can eliminate rigid partitioning on the conveying route 3, since the individual conveying elements 4, 5 can each be driven individually and independently of one another. This also makes it possible for a wide variety of different handling modules to be arranged in flexible fashion on the conveying route 3 without undesired build-up effects or the like occurring on account of rigid partitioning. In particular a spatially flexible arrangement of handling modules is made possible here, and therefore a space-saving construction of the transporting apparatus as a whole is achieved. It is also the case that there is no need to provide any empty stations or the like in order to avoid build-ups. It is further possible, for example in the case of format alterations, for additional handling modules to be readily installed and/or removed. The capability for driving the conveying elements 4, 5 individually also makes it possible that time-critical handling operations could proceed, for example, more slowly and for the amount of time which is used up in addition for this purpose to be made up again during other handling operations. Additional machine-output reserves can be exploited as a result. It is therefore possible, depending on the handling module, for different movement sequences to be achieved by means of the transporting apparatus according to the invention.

What is claimed is:

1. An apparatus for transporting articles, comprising
a circulating conveying route (3), and
a multiplicity of conveying devices (40), which circulate on the conveying route (3) along a running direction,
wherein each conveying device (40) comprises a first conveying element (4) and a second conveying element (5),
wherein the first conveying element (4) and the second conveying element (5) in each conveying device (40) are separately spaced from one another and are driven individually and independently of one another, such that a spacing between the first conveying element (4) and the second conveying element (5) as measured along the running direction is adjustable,
wherein the conveying elements (4, 5) are configured to transport an article (2) together, and
wherein the first conveying element (4) and the second conveying element (5) of each conveying device (40) each have a handling device, wherein the handling device of the first conveying element (4) differs from the handling device of the second conveying element.

2. The apparatus as claimed in claim 1, characterized in that the conveying elements (4, 5) are driven independently of one another by linear drives.

3. The apparatus as claimed in claim 1, characterized in that the circulating conveying route (3) is arranged vertically.

4. The apparatus as claimed in claim 3, characterized in that the articles (2) are transported on a lower-strand region (31) of the conveying route (3).

5. The apparatus as claimed in claim 1, characterized in that the handling device of the first conveying element (4) is an erecting device for erecting a collapsed packaging means.

6. The apparatus as claimed in claim 1, characterized in that the handling device of the second conveying element (5) is a retaining device for retaining a packaging means.

7. The apparatus as claimed in claim 5, characterized in that the erecting device is a pivotable lever (6).

8. The apparatus as claimed in claim 3, characterized in that arranged beneath the vertically arranged conveying route (3) is a packaging-means module with a packaging-means store (20).

9. The apparatus as claimed in claim 3, characterized in that the vertically arranged conveying route (3) has arranged to a side thereof a loading module (13) for laterally loading a packaging means (2) conveyed on the conveying route (3).

10. The apparatus as claimed in claim 1, characterized in that the articles which are to be transported are packaging means.

11. The apparatus as claimed in claim 1, characterized in that the apparatus is a cartoning apparatus.

12. The apparatus as claimed in claim 3, characterized in that arranged beneath the vertically arranged conveying route (3) is a closure module (14) for closing packaging means.

13. The apparatus as claimed in claim 3, characterized in that arranged beneath the vertically arranged conveying route (3) is an identifying module (12) for providing packaging means with identification.

14. The apparatus as claimed in claim 3, characterized in that arranged beneath the vertically arranged conveying route (3) is a weighing module for weighing empty and/or loaded packaging means.

15. The apparatus as claimed in claim 3, characterized in that arranged beneath the vertically arranged conveying route (3) are a packaging-means module with a packaging-means store (20), a closure module (14) for closing packaging means, an identifying module (12) for providing packaging means with identification and a weighing module for weighing empty and/or loaded packaging means.

16. The apparatus as claimed in claim 1, characterized in that the articles which are to be transported are cartons.

\* \* \* \* \*